United States Patent
Wagner

[11] 3,900,867
[45] Aug. 19, 1975

[54] INTERROGATOR-RESPONSOR SYSTEM FOR DIFFERENT INTERROGATOR CODES

[75] Inventor: Gerhard Wagner, Schaftlach, Germany

[73] Assignee: Siemens Aktiengesellschaft, Berlin and Munich, Germany

[22] Filed: Feb. 9, 1973

[21] Appl. No.: 331,173

Related U.S. Application Data

[63] Continuation-in-part of Ser. No. 110,888, Jan. 29, 1971, abandoned.

[52] U.S. Cl. .............................. 343/6.5 LC; 343/7.5
[51] Int. Cl. .............................................. G01s 9/56
[58] Field of Search ......... 343/6.5 R, 6.5 LC, 6.8 R, 343/6.8 LC, 7.5

[56] References Cited
UNITED STATES PATENTS
3,750,163   7/1973   Hecker .......................... 343/6.5 R Primary Examiner—T. H. Tubbesing
Attorney, Agent, or Firm—Hill, Gross, Simpson, Van Santen, Steadman, Chiara & Simpson

[57] ABSTRACT

An interrogation system in which comparison circuits determine lead or lag of an interrogation code in the answering apparatus, i.e., transponder, and provide a compensating correction. The system employs time dependent differing interrogation codes which are successively transmitted from an interrogation apparatus to one or more answering apparatuses. Time dependent differing answer codes, logically related to the interrogation codes, are employed to indicate a friendly answer. The answer codes are generated and stored as past, present and future time codes. Lead or lag of the clock of the answering apparatus with respect to the interrogation apparatus is determined by a comparison of stored and received interrogation codes so that a resetting of the code program and/or an adjustment of the clock can be performed to achieve synchronism.

12 Claims, 10 Drawing Figures

INVENTOR
Gerhard Wagner

INVENTOR
Gerhard Wagner

BY  ATTYS.

Fig. 9

INTERROGATOR-RESPONSOR SYSTEM FOR DIFFERENT INTERROGATOR CODES

CROSS-REFERENCE TO RELATED APPLICATIONS

This application is a continuation-in-part of application Ser. No. 110,888, filed Jan. 29, 1971, now abandoned. The apparatus of this invention is also related to U.S. patent application Ser. No. 110,889 filed Jan. 29, 1971, now abandoned, and a continuation-in-part of that application, Ser. No. 331,174, filed Feb. 9, 1973, and is further related to Ser. No. 76,272, filed Sept. 30, 1970, now abandoned.

BACKGROUND OF THE INVENTION

1. Field of the Invention

The invention relates to an interrogation-response system for time-dependently different codes, which are sent out successively in time from an interrogation apparatus (transmitted interrogation codes) and from one or more answering devices (answering codes) to which the time-dependent program of the interrogation devices is known and in addition making use of time-dependent answering codes associated with the interrogation codes according to a predetermined logical linkage, in which there is provided in the interrogation device and in the answering device a time clock for the control of the code sequence.

2. Description of the Prior Art

The above-identified related patent application Ser. No. 76,272 describes the basic type of interrogation-answer system with which the present invention is concerned.

If every friendly object is to provide the valid answer at the right moment, then it must possess, in addition to the valid sequence of the codes, also the information as to when the individual codes apply. An initial synchronism of the time clocks is established in interrogation and answering devices at a certain time (for example, at the take-off of an airplane). After this, however, there occur gradually increasing differences in the time indications of interrogation and answering devices, for example due to oscillator drift. The timing generators (clocks) of the answering devices are primarily responsible for this. The synchronism of the interrogation devices among one another could be improved by providing an arrangement such that they have at their disposal time clocks whose drive over a relatively long period of time does not impair the functioning of the answering code. The problem would be far less if there could be added to each answering device in use a highly accurate clock frequency. This expenditure, however, is too high for reasons of costs and space requirements.

SUMMARY OF THE INVENTION

The invention avoids the above difficulties by the means that in the answering device, in addition to the presently valid interrogation code, there are also stored interrogation codes corresponding to future and past times and that through comparison between the interrogation codes actually arriving in the answering apparatus and the stored interrogation codes the lead or lag of the answering device time clock is determined and a correction signal is derived for the readjustment of the program and/or of the time clock of the answering device.

BRIEF DESCRIPTION OF THE DRAWINGS

The invention will be best understood from the following detailed description taken in conjunction with the accompanying drawings, in which.

DESCRIPTION OF THE PREFERRED EMBODIMENTS

Figure 1:
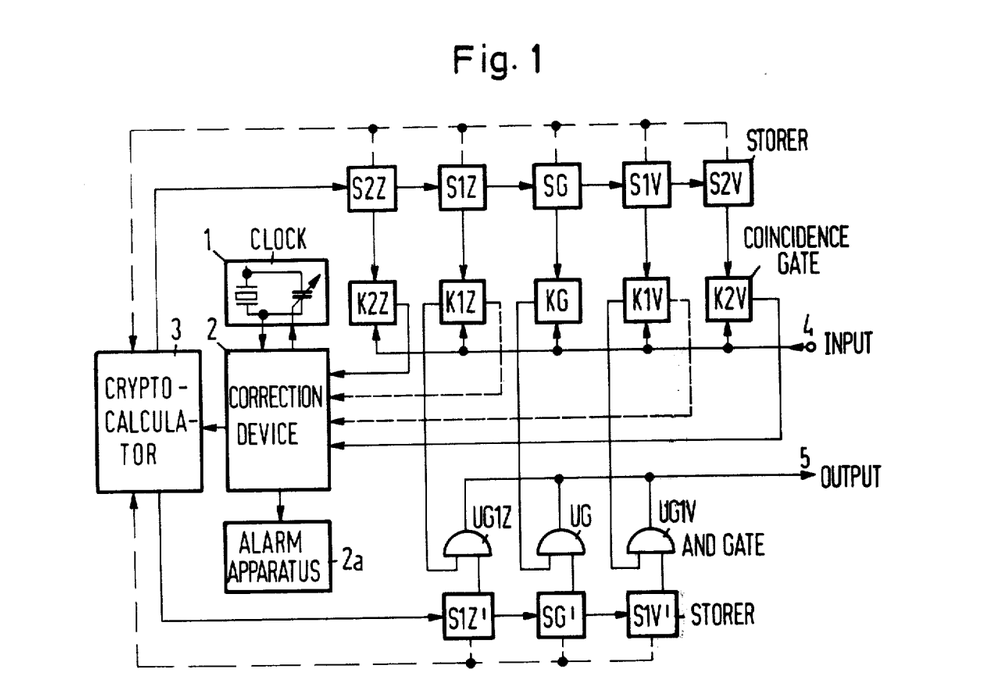
FIG. 1 shows, as an exemplary embodiment, an answering device in a block circuit diagram with synchronization for each individual interrogation.

In FIG. 1, an answering device contains a time clock (generator) 1, which controls a cryptocalculator 3 by way of a correction device 2. As will be described later, the cryptocalculator 3 generates, as in appertaining interrogation devices (see FIG. 9), certain codes successively at certain times, in which the sequence from one code to the other is, to be sure, arbitrary, but which remains the same in the interrogation apparatus and in the answering apparatus. The individual interrogation codes are supplied to storers (memories) S2Z, S1Z, SG, S1V and S2V. In this connection, here and in the following text, the following definitions hold: index "2Z" means the second future time, index "1Z" the first future time, index "G" the present, index "1V" the first past time and index "2V" the second past time, and particularly with reference to the time sequence of the interrogation code. If at the input terminal 4 there arrives an interrogation signal with a certain code, then, in the case of synchronism between interrogation device and answering device the coincidence stage KG will respond and via an AND-gate UG there is transmitted an answer signal with the code G over the line 5. For this response, the second input of the AND-gate UG is connected with a second storer SG'. The information in this second storer SG', as well as in the further present storers S1V', SG', S1Z' is likewise supplied from the cryptocalculator 3 and stand in a certain relation established by the cryptocalculator 3 in the upper storers provided with the respective indexes.

If an interrogation signal with an interrogation code corresponding to the first past time for the answering device arrives, the coincidence gate K1V responds and causes a control signal to pass to the correction device 2. The coincidence gate K1V further causes, via the AND gate UG1V, an answer signal with the code 1V over the line 5. The fact that there is coincidence between the arriving interrogation code and the code stored in storer S1V shows that the time clock 1 is leading with respect to the time clock in the appertaining interrogation apparatus. The signal emanating from the coincidence gate K1V brings about the correction device 2 a readjustment for the cryptocalculator 3, which provides for elimination of this time displacement. This is possible most simply by the means that the program in the cryptocalculator 3 is stopped for the present example, for one program step, whereby the influence of the leading time clock 1 is compensated. To be sure, in this case there could further occur a deviation with the time anew, because the time normal 1 as such may have a tendency to lead. It is expedient, therefore, under some circumstances, to make in addition to the shifting of the program, or also independently of such an adjustment, a correction of the time normal so that the tendency to differ is eliminated. With use of quartz oscillators as clocks it is possible, for example, to vary a tuning capacitance and thereby achieve a higher or lower frequency.

If the clock 1 leads still more, the arriving interrogation code will agree with the code stored in the storer S2V and will cause the coincidence gate K2V to respond. This, in turn, releases a signal for the correction device 2. In the case of excessively great deviation it will be expedient to dispense with the transmitting of answer signals. For this reason, in this case there is no longer provided any corresponding AND-gate on the answering line 5.

An analogous procedure is followed if the time clock 1 lags, as a consequence that the arriving interrogation signals have a code which corresponds in the answering device to the code representing the first future time (storer S1Z) or the second future time (storer S2Z). In the case of a lagging of the time clock 1 in such a way that this brings about a displacement by one code, the coincidence gate K1Z responds, triggers, via the AND-gate UG1Z together with the information from the storer S1Z', an answering signal on the line 5, which answering signal has a code which agrees with the code in the storer S1Z' and, therefore also with the code expected as an answer by the interrogation apparatus. Simultaneously, another signal goes into the correction device 2, which, analogously to the measures described in connection with leading time clocks, makes changes in the cryptocalculator 3 and/or in the clock 1, in order to remedy the lacking synchronism between interrogation code and prepared code. In the case of severely lagging time clock 1, interrogation signals can arrive which cause the coincidence gate K2Z to respond. In this case there is advantageously supplied only a single signal, a signal into the correction device 2; an answering signal can advantageously be omitted.

Even when a correction is made there is transmitted the answer which is allocated to the interrogation. Only after the correction is the allocation between code on the one hand and time on the other hand in the correct position, so that then it is possible to answer an interrogation with a code representative of present time. Interrogations which, from the view of the answering device belong to the past, should be drawn upon for the correction only to a restrict extent, because they can be imitated by an adversary and, under some circumstances, through a readjustment the deviation of the time clock from the desired frequency value would be increased more and more. More specifically, an enemy can receive the codes of an interrogation station and can transmit such codes again after a certain time delay. While it is true he may not be able to comprehend the content of the individual codes, he can advance the answering device with respect to its code succession in the direction toward past codes when the codes and the answering device are continuously subsequently adjusted on the basis of a past interrogation. This adjustment (lagging) can finally become so great that the answering device no longer answers its interrogations since it exceeds the maximum lag value, i.e. "2V" in FIG. 1 with respect to its presently valid code. As an example, the code "5V" may be the presently valid code.

Referring to FIG. 1, elimination of the broken lines provides the answer apparatus with means for determining if a lead or lag condition is greater than one code interval. With this construction the coincidence gates K1Z and K1V will have the same form as the coincidence gate KG and only be used to operate the corresponding gates UG1Z and UG1V to cause the transmission of a lead or lag indication over the output line 5.

Figure 2:
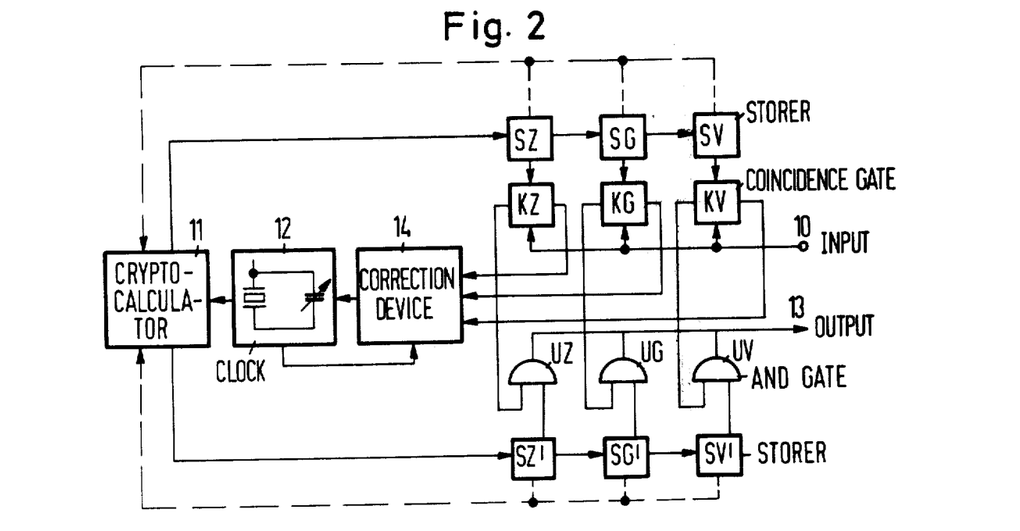
FIG. 2 shows a further exemplary embodiment an answering device in a block circuit diagram with synchronization corresponding to the frequency distribution.

In the answering apparatus according to FIG. 2 the incoming interrogation signals are supplied over the terminal 10 to coincidence gates KV, KG and KZ, which cooperate with storage devices SV, SG and SZ. In these storage devices there are stored the presently valid interrogation code (SG), the past interrogation code or codes (SV) and the future interrogation code or codes (SZ). The corresponding information is supplied from a cryptocalculator 11 which cooperates with a clock 12. On arrival of an interrogation signal having the presently valid code (i.e., the time normal generator 12 has no deviation) there is triggered in the coincidence gate KG a signal which drives the AND-gate UG and places an answer signal on the line 13. The AND-gate UG cooperates with a code storer SG', likewise controlled by the cryptocalculator 11, in which there is stored a code which is logically linked via the cryptocalculator 11 with the code in the storer SG. Information on the response of the coincidence gate KG, just as the information on the response of the coincidence gate KZ (in the case of lagging time clock 12) and the responding of the coincidence gate KV (in the case of leading time clock 12) is passed on to a monitoring system or correction device 14. Here a lead or lag occurrence is formed in such a way that it is ascertained whether the incoming interrogation codes coincide over a relatively long time with past, present or future answer codes of the answering device. Depending on the type of lead or lag there is made a readjustment of the time clock 12 and/or of the cryptocalculator 11, in which the procedure described in connection with FIG. 1 is followed.

On arrival of a signal which, for example, causes the coincidence gate KV to respond, however, the interrogation signal continues to be answered with the past code; i.e., the AND-gate UV which cooperates with the storage device SV' responds. The same procedure is followed in the case of arrival of an interrogation signal belonging to the future, in which case the coincidence gate KZ responds, triggers the AND-gate UZ and thereby triggers the storage device SZ' with the future code to place an answering signal on the line 13. This checking of the frequency distribution as criterion for the triggering of the correction signal has the advantage that individual time-displaced interrogation signals possibly coming from a jammer are drawn upon for a shifting of the time clocks or of the program course, and thereby the readjusting measures can be kept small. In all cases, it is taken as a basis of procedure that the time normal generators of the interrogation devices, in the case of which a greater expenditure can be made, operate more exactly than those of the answering devices.

Figure 3A:
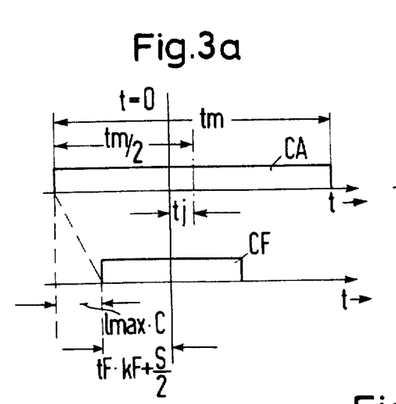
FIG. 3a shows the allocation between interrogation and answering codes with a leading time clock in the interrogation device.
Figure 3B:
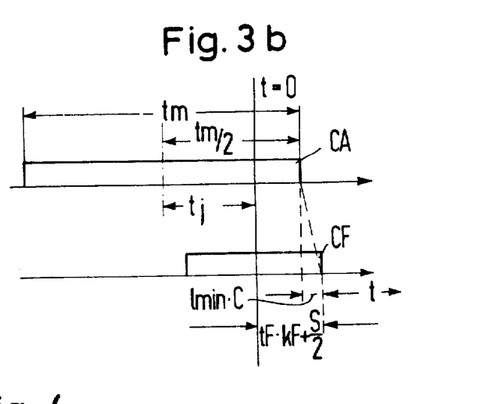
FIG. 3b shows the allocation between interrogation and answering code with a lagging time clock in the interrogation device.

In FIGS. 3a and 3b there are represented at the top in each case the error ranges for the answering code CA and for the interrogation code CF, in FIG. 3a there being assumed a leading time normal, and for FIG. 3b a lagging time normal. With the index "A" there are also designated in the following in each case answering devices, and with the index "F" there are designated interrogation devices. The vertical line $t=0$ designates the exact normal time, $tj$ the resulting deviation with all circumstances taken into consideration. For the cases of use to be considered there would hold the assumption that each object is repeatedly interrogated at the latest after $tA = 60$ min and thereby synchronized. For the time normal generator of the answering apparatus there is used a quartz oscillator which maintains a constancy of $kA = \pm 10^{-6}$. Then there can occur a maximal error of $tm = kA \cdot tA = \pm 3.6$ msec.

For the time normals of the interrogation devices there can be required a considerably higher accuracy of about $kF = \pm 10^{-9}$, which can be maintained with high-accuracy temperature-stabilized quartz oscillators. If the time clocks of the interrogation apparatuses are to be driven without readjustment for, say $tF = 30$ days, then there can occur in the individual time normal an error of $kF \cdot tF = \pm 2.6$ msec. With respect to the entire system, the time clocks of two interrogation devices after 1 month can differ from one another maximally by 5.2 msec. Let the initial individual synchronization error S amount additionally to 0.2 msec. The duration of an interrogation (about 0.1 msec) is neglected, because of code change which becomes due during the reception of an interrogation can be postponed by blocking up to the complete evaluation and answering of the interrogation without influencing the time clock.

For the determination of the possible period duration or validity duration of the code there is ascertained the maximal error deviation. An interrogation device whose time normal according to FIG. 4 leads after, say, 1 month by $tF \cdot kF$ (lowest line to the right of $t=0$), interrogates an answering device 1max (km) away, whose time normal leads precisely so much that there still takes place a correction, since the interrogation delayed by the transit time $1\max \cdot c$ ($c =$ speed of light) can still be compared with the code "presently" valid on board (middle line to the right of the line $t=0$).

Figure 4:
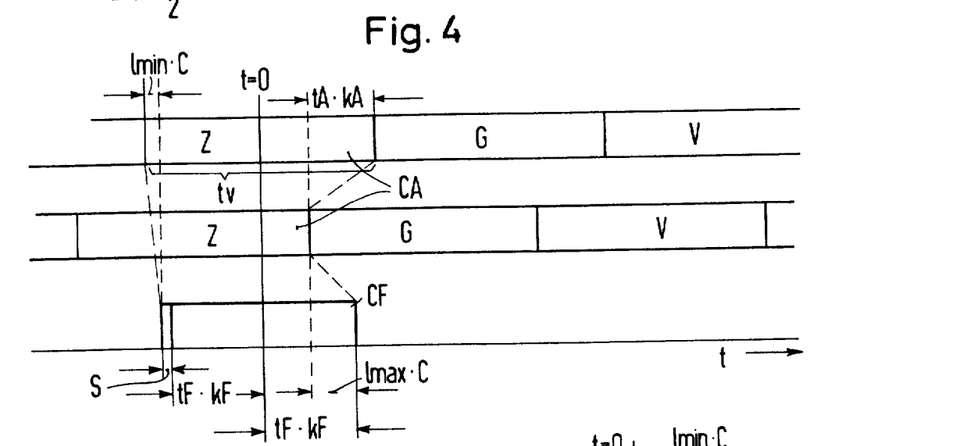
FIG. 4 shows a time diagram for the determination of the critical period duration in the case of leading time clock.

The same answering device, whose time normal continues to retain the "leading tendency," receives an interrogation again only after the time $tA$, which now comes from an interrogation device at the distance of 1min ($km$), whose time normal lags by $tF \cdot kF + S$ (lowest line to the left of the line $t=0$). Since under these circumstances still another correction should be possible, this interrogation has to be able to form coincidence with the "past" code. This is possible only if for the validity duration tm of the codes there holds the following relation:

$$tm = tV > 2 \cdot tF \cdot kF + S + kA \cdot tA + (1\max - 1\min) \cdot C \quad (1)$$

Figure 5:
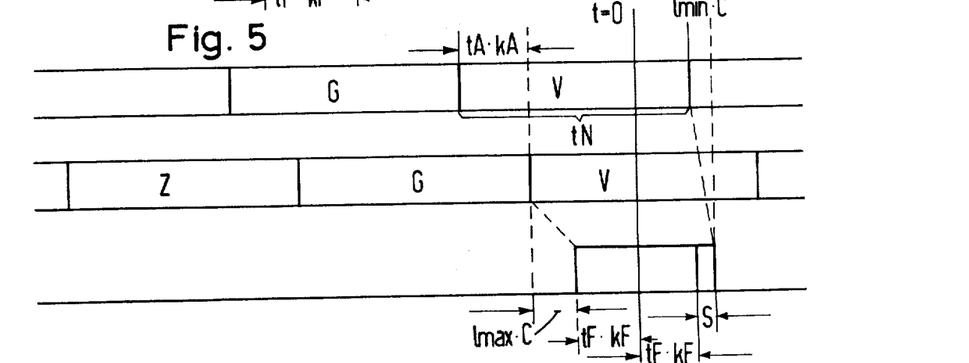
FIG. 5 shows a time for the determination of the critical period duration in the case of lagging time clock.

Analogous considerations for, in the first place, lagging (slow) clocks lead--as is evident from FIG. 5, analogously to FIG. 4—to the relation for the validity duration $tm^*$ of the codes, wherein $$tm^* > 2 \, tF \cdot kF + S + kA \cdot tA - (1\max - 1\min) \cdot C \quad (2)$$

Therefore, $tm = tV$ according to (1) takes into account the most favorable case. The value $tV$ is subject in addition, because of the unavoidable transponder transit time $L$ and the signal transit time, to a further condition, since the answers in the interrogation device still have to be compared with the "presently" valid code; there holds the relation $tv > 2 \cdot 1\max \cdot c + L$ (3)

For the distance 1max the greatest identification range occurring in the system has to be substituted, while 1min can be 1min = 0.

If the data mentioned are drawn upon under the assumption of a distance 1max = 300 km, there is provided $tm = 10$ msec. From this there results a usable interrogation repetition frequency of code-change frequency of $1/tm = 100$ Hz.

Figure 6:
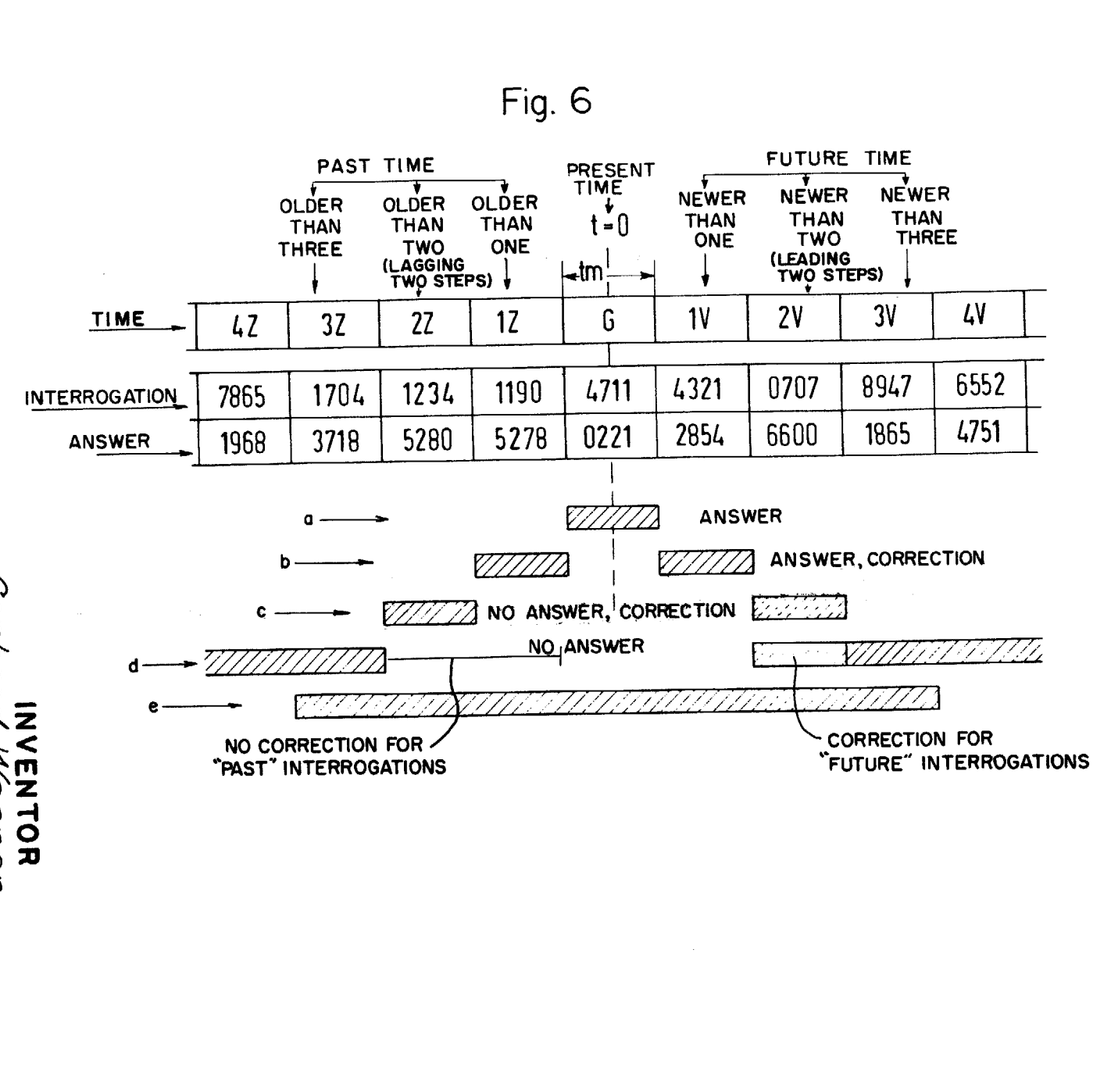
FIG. 6 shows a code distribution with appertaining correction distribution.

If for the correction there are also used interrogations which differ more than one beat from the "present," then, as is to be seen from FIG. 6, the sequence (repetition) frequency of the codes could be increased. In this case the first of a series of interrogations would not be answered.

Of special interest is the deviation $tJ$ between the clock of the answering apparatus and the clock of the interrogation apparatus, which permits, even without correction, a coincidence with the "present" code. FIG. 3a shows that for leading interrogation clocks there remains an admissible deviation of $$tJ < tm/2 - 1\max \cdot c - tF \cdot kF + S/2 \quad (4)$$

and for lagging clocks (FIG. 3b) a deviation of $tJ < tm/2 + 1\min \cdot c - tF \cdot kF + S/2$ (5)
(in the numerical example chosen 1.3 msec "before" or 2.3 msec "after").

The system can easily be adapted to border conditions which deviate from those mentioned in the example. Essentially the use of simple clocks has its effect in the answering apparatus. Even without use of expensive atomic reference oscillators as clocks in the interrogation device there can be achieved such a high accuracy that the code, in the case of an encoded information exchange, can be changed from inquiry to inquiry. An interferer or jammer cannot directly use codes monitored thereby for purposes of interference. Even if an interferer retransmits monitored codes immediately after reception, he will fall upon transit time-conditioned differences in the allocation between a secondary and a primary radar signal.

The code time allocation, in the case of further-going deviation, is brought to the correct state recognizable from the interrogation itself, if the deviation of the clock of the answering device does not exceed certain limits. This is explained with the aid of FIG. 6. In the uppermost row there is recorded from 4Z to 4V the beat sequence; under it, as an example of a code, in each case a four-place number for interrogation and answer, whose linkage takes place over the cryptocalculator in a manner known, too, in the interrogation station, but not reproducible for outsiders. In the case of a small deviation (1Z, 1V), there takes place answer and correction. If, however, an interrogation comes from a time range which extends over a fixed limit into the past or future, then for the immediate past or future there can still take place a correction; answers, however, should at first be omitted. In the case of still further deviation, there should be neither corrections nor answers, because otherwise there exists the possibility that interferers, through continuous transmitting of severely wrongly positioned interrogation codes will bring the answering apparatus virtually completely out of operation for the interrogation apparatus of its own. The total checking range, i.e., the part whose codes are stored, extends from 3Z to 3V. More specifically, FIG. 6 shows one possible operation of the system wherein line a shows that for a correct interrogation a correct answer is transmitted, line b shows that for lead or lag of only one interrogation an answer is transmitted and a correction is made, line c shows that lead or lag of two interrogations there is no answer and a correction is made to decrease the lead or lag, line d shows that for a lag of more than two there is no answer and no correction in that a foe which utilizes interrogations based on a pattern of past interrogations that could bring out the answering device in time so far that it would no longer answer friendly interrogations, only past interrogations, e.g., more than three, being available to a foe so that there is no correction for interrogations older than three interrogations and as future interrogations are not available to a foe a correction is allowed only for future interrogations, and line e illustrates that for lead or lag of more than three interrogation steps there is no answer and no correction. In the case of excessively great deviation an interference signal in the alarm apparatus 2a can be produced.

Figure 7:
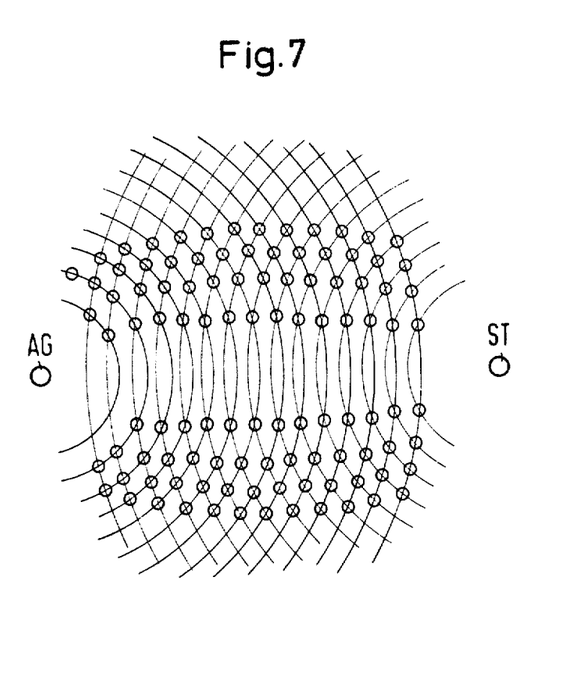
FIG. 7 shows the spatial position of disturbed zones in the case of use of an interfering transmitter.
Figure 8:
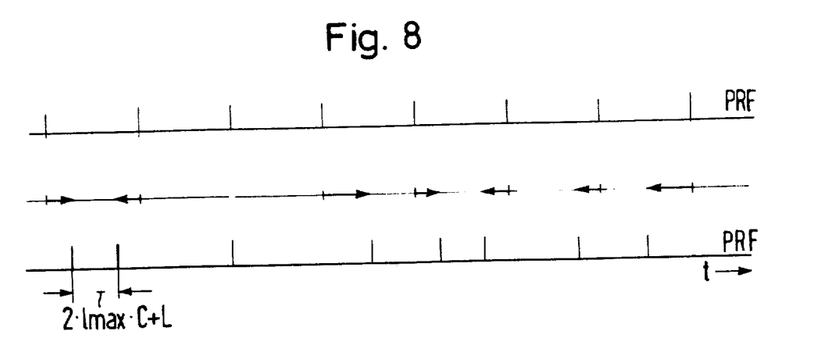
FIG. 8 shows the distribution of the interrogation signals for the avoidance of fixed interference zones.

A disadvantage can arise through the synchronism of the interrogations; an interfering transmitter, ST can, aimed according to FIG. 7, interfere with certain spatial ranges, if it transmits the interfering signals with suitable chosen pulse repetition frequency at the right moment, with account taken of the transit times of the interrogation signals of the interrogation apparatus AG. The advantage arises for the adversary through the small key (or repetition) ratio necessary for the interfering transmitter, because the interference strikes the identification signal in a narrowly limited time range. In order to make it impossible for the adversary to calculate in advance an "interfering zone," a statistical distribution of the interrogation time point about a mean beat period can be introduced. This is represented in FIG. 8. In the uppermost line there is represented the regular interrogation signal distribution. The "interrogation frequency" resulting through averaging according to the lower line is equal to that of the uppermost line. A minimum spacing of $2 \cdot 1 \max \cdot c + L$ should be maintained for the consideration of the transit time effects.

A "garbling" interference can occur in ranges which have two or more interrogation apparatuses of about equal distances, because the interrogations of several devices coincide with greater probability than in systems in which the interrogation time points scatter at random. A remedy can be achieved through measures which from the outset prevent the simultaneous interrogation by several stations.

In principle, the accuracy of the clocks used can without damage be further reduced, if the checking range of the compared codes is extended (see FIG. 6). This, however, is not favorable in the case of the friend-or-foe identification (IFF) in the scope, for example, of secondary radar apparatuses because of the danger of imitation. If it is considered, however, that the sequence generated in the encoding key apparatus of code words represents nothing but a sequence of recoded time data, it is possible to conceive that in cases of application, without danger of imitation, an "extended coincidence schedule" certainly offers advantages when it is a matter of synchronizing devices corresponding with one another without special correction signals solely by the clock time transmitted from time to time.

In aviation or navigation collision avoidance systems (CAS) with accurate ship's chronometers, the clocks already available (chronometers on board) can be used simultaneously for the code control.

The program and coding apparatus may be constructed in accordance with the teachings of David Wise and Thomas B. Ross as set forth in their book "The Espionage Establishment," particularly Chapter 2, Random House, Copyright 1967 by the authors, and the teachings set forth in the "Handbook of Information Processing" by Steinbuch, Springer-Verlag, Berlin/Heidelberg/New York, 1967, Pages 969–971, and in the 1957 issue of the periodical "NTZ," Pages 277, et seq. The storage sections may be constructed in accordance with well known shift register techniques. Reference may also be taken to an article by Karnaugh, entitled "The Map Method for Synthesis of Combinational Logic Circuits," appearing in the November 1953 issue of the AIEE Transactions, Part I, Pages 593–598. In the last mentioned article the example of a relay translator on Page 597 is of particular interest in that a simple example of a translator is disclosed. Also of interest to one who wishes to practice the present invention is the article "On the Transmission of Information by Orthogonal Time Functions," by H. F. Harmuth, as printed in the July 1960 issue of AIEE Transactions, Pages 248–255.

Inasmuch as the above-mentioned Steinbuch publication and the "NTZ" publication are not in English, excerpts of these publications are discussed below.

Steinbuch states beginning at the first half of Page 970 that coupling control can be described as follows $$x_1 = x_2 \rightarrow y$$
$$(\bar{x}_1 \ \& \ \bar{x}_2) \ \lor \ (x_1 \ \& \ x_2) = y.$$

The article goes on to say that the output variable is a mere function of the input variable. If several circuits are combined into a network in such a way that several output variables $y_1, y_2, y_3, \ldots$ etc., are provided, one can speak of a translator. The author continues by saying that in the English language the term combinational switching circuit is in somewhat general use. Each combination of input information $x_1, x_2, x_3, \ldots$ etc., which is available at a certain time leads to one combination of output variables $y_1, y_2, y_3 \ldots$ etc. A circuit is, in this sense, a small scale translator. The translator does not employ storage elements. When the $y_1$ output depends at a certain time on a $x_k$ input, it is obviously unimportant which combination of input information $x_k$ has previously arrived before this time, or at any other time. By means of a system of coupling equations of Boolean algebra, the attitude of a translator can be described. The extension of the actual coupling process over long periods of time has therefore been eliminated from consideration. In a particularly simple example, the description of the translator may be set forth in the form of a table as follows:

| $x_1$ | $x_2$ | $x_3$ | $y_1$ | $y_2$ | $y_3$ |
|---|---|---|---|---|---|
| 0 | 0 | 0 | 1 | 0 | 0 |
| 0 | 0 | 1 | 1 | 0 | 1 |
| 0 | 1 | 0 | 1 | 0 | 0 |
| 0 | 1 | 1 | 0 | 1 | 1 |
| 1 | 0 | 0 | 1 | 0 | 1 |
| 1 | 0 | 1 | 0 | 1 | 0 |
| 1 | 1 | 0 | 0 | 0 | 1 |
| 1 | 1 | 1 | 0 | 0 | 0 |

The "NTZ" article discusses translators on Page 279, as follows. All electrical translators in the previously mentioned cases have a common feature in that words of an input language are to be translated into words of an output language. For example:

| INPUT LANGUAGE | OUTPUT LANGUAGE |
|---|---|
| Number Code A | Number Code B |
| Multiplicand and Multiplier | Product |
| Sum A, Sum B | Sum A+B |
| Telephone Character | Conductor Path |
| Telephone Character | Zone |
| Gross Salary, Tax Bracket | Amount of Tax |
| No. Article | Price of Article |
| Name of Post Office (Telephone Office) | Area Code |
| Words of Language A | Words of Language B |

In general, each word of the input language must be illustrated in the translator in some form, individually and explicitly, unless it is a coincidence circuit in a static translator, or it is arranged as a storage cell in a memory. For example, during multiplication, the result can not be obtained merely from the multiplier or the multiplicand, which means that all possible combinations from both quantities must be formed in a decimal multiplier number from a corresponding number of coincidence circuits (as shown in FIG. 2 of this article). Only if the multiplier or the multiplicand is zero, will one quantity statement be sufficient, which means that the coincidence circuits for 0×0, 0×1, 0×2 . . . 0×9 can be omitted, and from a zero in the input, the resulting zero can be directly obtained. In the case of most applications, as in these simple examples, under normal circumstances all complete input words must be set forth separately so that a translator with 10,000 input words, for example, wherein no corelation exists between input words and output words, requires a total of 10,000 individual coincidence circuits (as illustrated in Section 3.6 of this article) and this effort and expense cannot be reduced by any technical measure.

More specifically and with respect to the present invention, from the Steinbuch book it can be seen that the $x_1$, $x_2$, $x_3$ represent in digital counting, the successive numbers 1, 2, 3 and so on (line one $\doteq$ 0, line two $\doteq$ 1, line three $\doteq$ 2 and so on). Yet the corresponding $y_1$, $y_2$, $y_3$ do not represent successive numbers. They are mixed in a random distribution. Therefore, it is not possible to find out from the $y_1$, $y_2$, $y_3$ that they are generated by a successive counting of the $x_1$, $x_2$, $x_3$. It is possible to produce the $x_1$, $x_2$, $x_3$ in a successive manner by using a clock. If a translator is connected to the clock in the way described above, one can use the combination clock and translator for producing codes $y_1$, $y_2$, $y_3$ which successively change in time in a random manner seen from the output.

The clock 1 can be used as a digital counter in the way described at the Steinbuch publication ($x_1$, $x_2$, $x_3$). The cryptocalculation is performed by the translator described in the Steinbuch publication, which translates the successive $x_1$, $x_2$, $x_3$ codes to random $y_1$, $y_2$, $y_3$ codes at its output. At the interrogation station the same clock 1 and translator as a cryptocalculator 3 are used. Therefore, if both stations start at the same time counting by their clocks 000, 001, 010 . . . (= $x_1$, $x_2$, $x_3$) they will both successively produce at the same time the same codes 100, 101, 100 . . . (= $y_1$, $y_2$, $y_3$).

Figure 9:
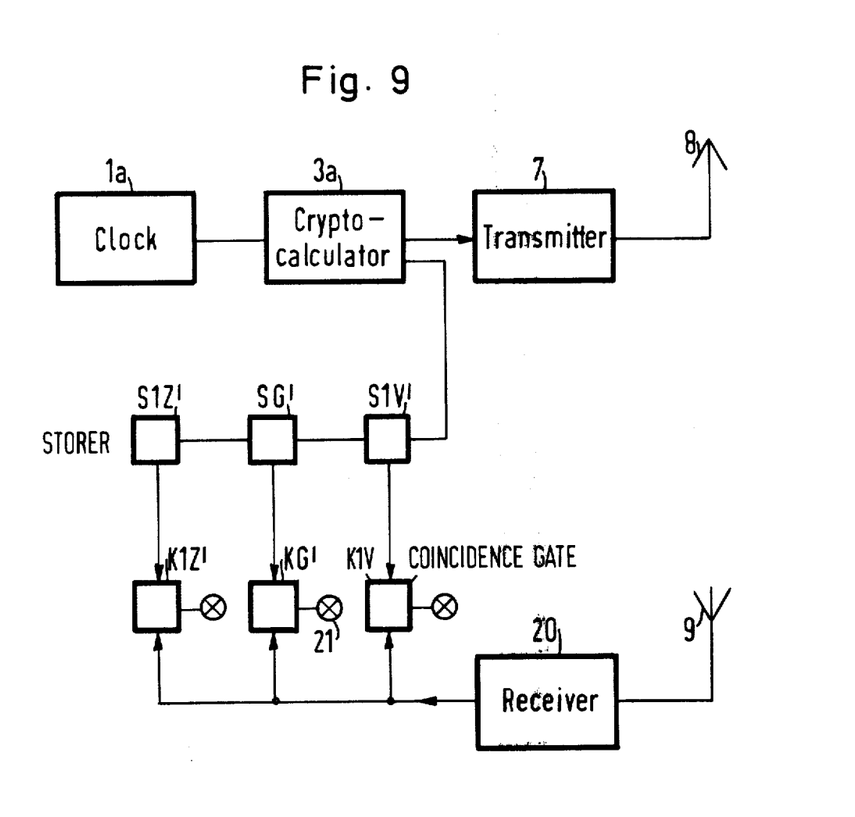
FIG. 9 is a block diagram of an interrogation station.

The interrogation station for the arrangement according to FIG. 1 has been illustrated in FIG. 9. It contains a clock 1a (time normal) and a cryptocalculator 3a. These two elements have been constructed in the same manner as elements 1 and 3 of FIG. 1, and both clocks run synchronously. The interrogation codes reach a transmitter 7 and are emitted via an antenna 8. These interrogation codes are then received at the answer device, at the terminal 4. Thus the codes 2V, 1V, G, 1Z, 2Z, etc., are transmitted, one after the other.

If a correctly timed answer signal is received by the receiving antenna 9 and passes from the receiver 20 to the coincidence gate, the latter would have the code G' (equal presently valid code), and a reaction of the coincidence gate KG' would result. This reaction may, for instance, be realized by a lamp 21 which would make it clear for the observer that the reply device has answered correctly.

Many changes and modifications may be made in the invention by one skilled in the art without departing from the spirit and scope of the invention and it is to be understood that I intend to include within the patent warranted hereon all such changes and modifications as may reasonably and properly be included within the scope of my contribution to the art.

I claim:

1. In an interrogation-answer system for secondary radar with time dependently changed codes which are transmitted successively in time by an interrogation apparatus and at least one answering apparatus having means for receiving an interrogation code and means producing and storing therein the time-dependent program of the interrogation codes to be expected from the interrogation apparatus and providing time-dependent answering codes which are related in such a predetermined manner to the interrogation codes that for each one of the interrogation codes one predetermined answer code is transmitted to the interrogation apparatus, the interrogation apparatus and the answering apparatus each having a clock connected thereto and operable to provide the same time standard for controlling the code sequence, the answering apparatus comprising means storing codes representing past, present and future time as respective past, present and future interrogation codes, means connected to said storage means for comparing the received interrogation code with the past, present and future codes to determine lead or lag of the answering apparatus time standard with respect to that of the interrogation apparatus, and means connected to said comparing means and to said clock of said answering apparatus for correcting the production of the time dependently changed codes in the answering apparatus.

2. Interrogation-answer apparatus comprising: clock means operable to provide a time standard; code means connected to said clock means and operative in response to said time standard to produce a program of first codes representing past, present and future time of interrogation codes to be received from the interrogation apparatus; first storage means connected to said code means including a plurality of first storage sections for storing respective first interrogation codes to be received; an input for receiving an interrogation code; a plurality of coincidence circuits connected to said input and to respective first storage sections and one of said coincidence circuits individually operable in response to coincidence between any one of the first codes and an interrogation code received at said input to indicate synchronism, lead or lag of the first codes relative to the received interrogation code; and correction means connected to at least some of said coincidence circuits, to said clock means and to said code means and operable to adjust the production of said first codes in response to the operation of a coincidence circuit to correct for lead or lag between a first code and the received interrogation code.

3. Apparatus according to claim 2, wherein said code means is also operable to produce a program of second codes which bear a predetermined relationship to said first codes, and comprising second storage means connected to said code means including a plurality of second storage sections for storing said second codes; an answer output; and gating means interposed between said second storage sections and said answer output and connected to and controlled by the operation of said coincidence circuits to gate a second code to said answer output.

4. Apparatus according to claim 2, comprising an alarm apparatus controlled by a coincidence circuit which represents a large time deviation from the present time and operable to indicate such large deviation.

5. An interrogation-answer system comprising: interrogation apparatus including interrogation means for producing and transmitting interrogation codes and a first clock for driving said interrogation means; answer apparatus comprising a second clock; code means driven by said second clock to produce a program of first codes representing past, present and future time; means for receiving said interrogation codes; means for comparing the first codes with received interrogation codes to determine lead or lag of said second clock relative said first clock; and means for correcting the production of said first codes in response to the determination of a lead or lag condition.

6. A system according to claim 5, wherein said comparing means comprises first storage means for storing said first codes, an interrogation input and coincidence means connected to said input and said first storage means for determining coincidence of a first code and an interrogation code.

7. A system according to claim 6, wherein said answer apparatus comprises second storage means and said code means is operable to store a plurality of second codes therein related to and corresponding as answer codes to said first codes; an answer output; and gating means interposed between said second storage means and said answer output and connected to and operated by said coincidence means for gating a second code to said answer output.

8. A method of synchronizing an interrogation apparatus with an answer apparatus comprising the steps of transmitting from the interrogation apparatus to the answer apparatus a time dependent program sequence of interrogation codes, generating at the same time about the same programmed sequence of interrogation codes in the answering apparatus, storing in the answering apparatus interrogation codes corresponding to past, present and future time, receiving a transmitted interrogation code at the receiving apparatus, comparing the received code with the stored codes to determine a coincidence therebetween, and adjusting the speed of code production at the answering apparatus in accordance with the coincidence between a received interrogation code and a stored interrogation code which does not correspond to the present time until coincidence between received and stored present codes is achieved.

9. A method according to claim 8, further comprising the steps of producing a program of answering codes which are related in a predetermined manner with the interrogation codes, storing the answer codes, and transmitting that answer code which corresponds to that stored interrogation code which is in coincidence with the interrogation code actually received.

10. A method according to claim 8, wherein the interrogation and answer codes produced in the answer apparatus have their time sequences provided in accordance with the operating of a clock, and wherein the step of adjusting is further defined as changing the frequency of the clock.

11. Interrogation-answer apparatus comprising: clock means operable to provide a time standard; code means connected to said clock means and operative in response to said time standard to produce a program of first codes representing past, present and future time of interrogation codes to be received from the interrogation apparatus; first storage means connected to said code means including a plurality of first storage sections for storing respective first interrogation codes to be received; an input for receiving an interrogation code; a plurality of coincidence circuits connected to said input and to respective first storage sections and one of said coincidence circuits individually operable in response to coincidence between any one of the first codes and an interrogation code received at said input to indicate synchronism, lead or lag of the first codes relative to the received interrogation code; and correction means connected to at least some of said coincidence circuits, to said clock means and to said code means and operable to adjust the production of said first codes in response to the operation of a coincidence circuit to correct for lead or lag between a first code and the received interrogation code, said code means being operable to produce a program of second codes which bear a predetermined relationship to said first codes, and comprising second storage means connected to said code means including a plurality of second storage sections for storing said second code; an answer output; and gating means interposed between said second storage sections and said answer output and connected to and controlled by the operation of said coincidence circuits to gate a second code to said answer output, said first storage sections further including a storage section for each of the second past, first past, first future and second future interrogation codes expected to be received for comparison with received interrogation codes.

12. Apparatus according to claim 11, wherein said second storage sections include a storage section for those second codes which are related as answer codes to said first past and first future interrogation codes expected to be received.

* * * * *